United States Patent [19]
Anderson

[11] Patent Number: 5,137,079
[45] Date of Patent: Aug. 11, 1992

[54] CLOSED CIRCUIT COOLING SYSTEM

[75] Inventor: Neil A. Anderson, Edinburgh, United Kingdom

[73] Assignee: GEC-Ferranti Defence Systems Limited, Stanmore, United Kingdom

[21] Appl. No.: 633,512

[22] Filed: Dec. 28, 1990

[30] Foreign Application Priority Data

Jan. 17, 1990 [GB] United Kingdom ............... 9001062

[51] Int. Cl.$^5$ .................... G05D 23/12; F28F 27/02
[52] U.S. Cl. ...................................... 165/38; 165/35; 165/104.33
[58] Field of Search ............... 165/35, 38, 32, 104.33

[56] References Cited

U.S. PATENT DOCUMENTS

| | | | |
|---|---|---|---|
| 1,382,569 | 6/1921 | Tait | 165/35 |
| 1,793,841 | 2/1931 | Curtis | |
| 4,589,378 | 5/1986 | Hundertmark | |
| 4,730,663 | 3/1988 | Volkl | 165/32 |
| 4,744,335 | 5/1988 | Miller | |

FOREIGN PATENT DOCUMENTS

| | | |
|---|---|---|
| 321157 | 9/1917 | Fed. Rep. of Germany |
| 930786 | 3/1953 | Fed. Rep. of Germany |
| 2931682 | 2/1981 | Fed. Rep. of Germany |
| 532894 | 2/1922 | France |
| 516499 | 1/1940 | United Kingdom |
| 1079539 | 8/1967 | United Kingdom |

Primary Examiner—Albert W. Davis, Jr.
Attorney, Agent, or Firm—Spencer, Frank & Schneider

[57] ABSTRACT

A cooling fluid is circulated around a closed circuit including a heat source, for example by a pump. The system includes a heat exchanger for removing heat from the fluid. Valve means are provided which are operated by changes in volume of the cooling fluid to cause the fluid to bypass the heat exchanger when the temperature of the fluid is below a predetermined value.

9 Claims, 3 Drawing Sheets

CLOSED CIRCUIT COOLING SYSTEM

The present invention relates to a closed circuit cooling system, that is a cooling system in which no interior part communicates directly with the outside in normal use.

Closed circuit cooling systems are well-known for removing excess heat from many different situations by means of circulating a cooling fluid between a heated body and a heat exchanger. Usually the operation of such systems includes the use of some form of temperature dependent control, usually by mechanical or electrical thermostatic device. In the case of the cooling of a compact heat source or heated body it is known to pass a cooling fluid around or through the heat source. To provide for rapid heating to a preset desired operating temperature the fluid is not passed to a heat exchanger until the temperature of the fluid rises towards or reaches a value which ensures optimum operating temperature. When that temperature value is reached the operation of a valve causes the fluid to be passed to the heat exchanger.

A common example of such a system is the cooling system of an internal-combustion engine in a motor vehicle, where a mechanical valve or thermostat responds directly to the temperature of the water used to cool the engine. Provision has to be made in a closed circuit cooling system to allow for the expansion of the coolant. Again considering the case of a motor vehicle it is usual to provide an expansion chamber containing air in which the liquid coolant expands such that the air becomes pressurized.

Closed circuit cooling systems are known in which the expansion chamber contains a collapsible body such as a metal bellows, which is compressed by the expanding fluid. Such systems use a separate temperature-controlled bypass valve, the thermostatic valve, to control the configuration of the closed circuit around which the cooling fluid flows.

GB 1079539 discloses a closed circuit cooling system comprising a cooling circuit connecting a heated body to a heat exchanger and including means for circulating a cooling fluid and a valve including a variable volume actuator, for bypassing the heat exchanger. The valve comprises a flexible bellows, the interior of which is connected to the cooling circuit at or near a restriction which acts as a venturi. The pressure drop in the venturi throat causes a change in the volume of the bellows and operates the valve.

It is an object of the present invention to provide a closed circuit cooling system requiring fewer components.

SUMMARY OF THE INVENTION

According to the present invention, there is provided a closed circuit cooling system comprising a cooling circuit connecting a heated body to a heat exchanger and including means for circulating a cooling fluid, a valve including a variable volume actuator being provided for bypassing the heat exchanger; characterized in that in use, changes in the volume of the cooling fluid cause the variable column actuator to change volume to actuate the valve so as to cause the fluid to bypass the heat exchanger when the temperature of the fluid is below a predetermined valve and to accommodate any changes in fluid volume due to temperature changes.

BRIEF DESCRIPTION OF THE DRAWINGS

The invention will now be described with reference to the accompanying drawings, in which.

DESCRIPTION OF THE PREFERRED EMBODIMENTS

Figure 1:
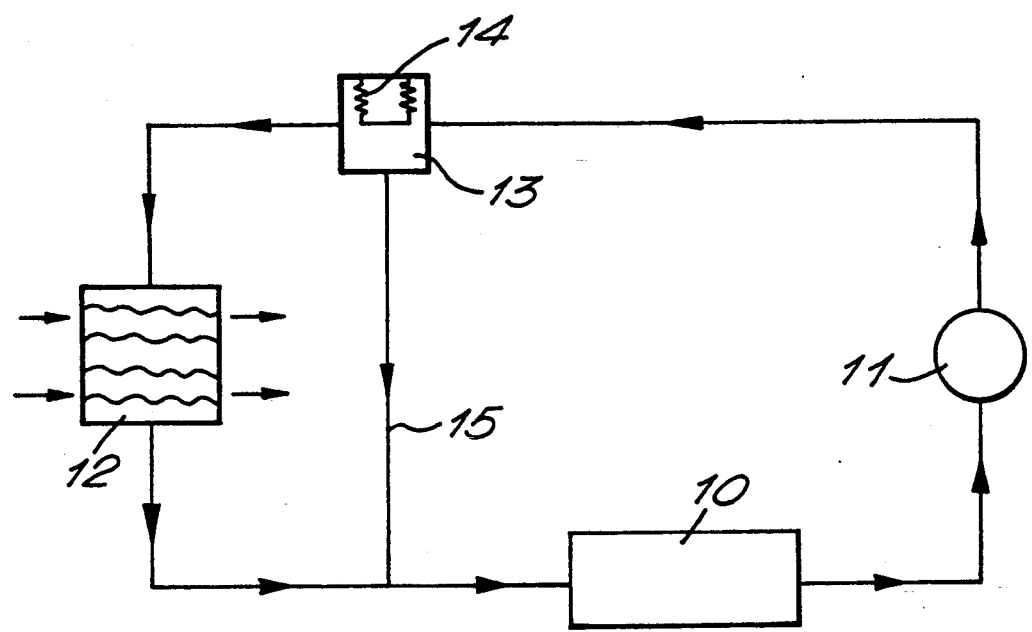
FIG. 1 is a schematic diagram of a cooling system according to an embodiment of the invention.

Referring now to FIG. 1, this illustrates a closed circuit cooling system using a liquid to remove heat from a heat-producing body 10 such as a laser. The liquid is circulated by a pump 11 around the circuit which includes a heat exchanger 12. A fluid, commonly air, passes through the heat exchanger 12 and removes heat from the circulating liquid. Since the cooling system is sealed, provision has to be made for the expansion of the circulating liquid as its temperature rises. Conveniently this is done by providing an expansion chamber 13 which may consist of a flexible bellows 14 having the fluid in contact with one surface and conveniently, having the other surface exposed to ambient air pressure.

A cooling system as so far described is conventional but has certain disadvantages if the body 10 is best operated at an elevated temperature. In particular, warm-up of the body is slow since the cooling liquid is always circulating through the heat exchanger. This problem may be avoided by providing a bypass 15 for the heat exchange with a valve to close the bypass and pass the cooling liquid through the heat exchanger 12 when the temperature of the liquid rises. It is usual for a temperature-sensitive device such as a thermostat to be used for this purpose, either forming part of the valve or remotely controlling the operation of the valve. By "thermostat" is meant a device, usually mechanical or electrical, which is directly responsive to the temperature of the cooling fluid and to no other parameter of that fluid.

According to the invention the need for a thermostat is avoided. Instead, use is made of the fact that the expansion chamber 13 contains a movable member which may itself act as or operate the necessary valve. In this case, therefore, the valve is operated in changes in the volume of the cooling fluid at its temperature changes and not due to the temperature of the fluid itself.

Figure 2:
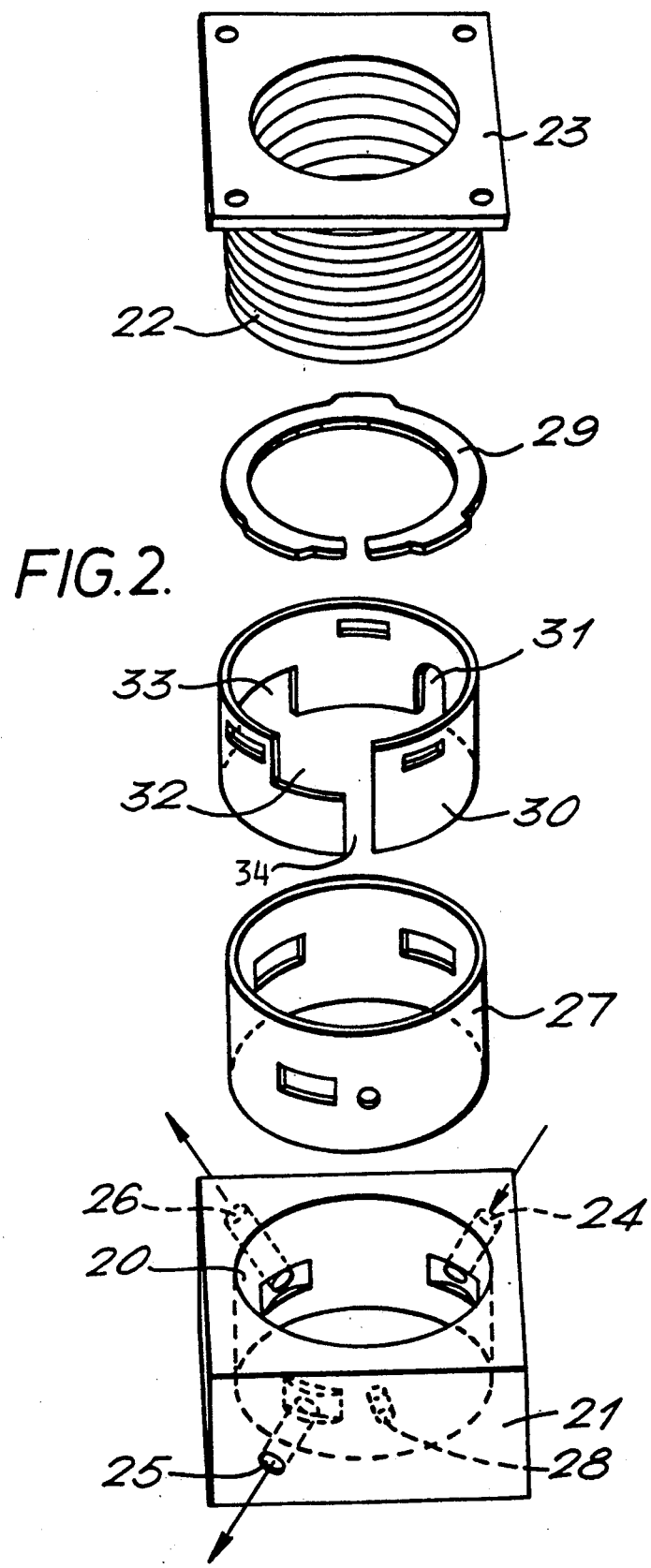
FIG. 2 is an isometric exploded view of one form of valves for use with the invention.

FIG. 2 is an exploded isometric view of one form of valve which may be used. The expansion chamber is formed by a cylindrical chamber 20 in a body 21. A bellows element 22 of metal or other suitable material is located inside the chamber 20 which is sealed by a bellows mounting plate 23. Three passages or ports are formed through the side of the body 21 to communicate with the chamber. These passages are be denoted by the references 24, 25 and 26.

The inside of the chamber is provided with a fixed sleeve 27, held in position by a peg 28. Sleeve 27 may be split by a slot (not shown) to enable it to be an interference fit in the chamber 20. Three apertures are formed through the sleeve 27 to allow each of the passages 24, 25 and 26 access to the chamber 20.

Attached to the bottom of the bellows 22 by a fastener such as a circlip 29 is a valve member 30. This is able to slide coaxially within the sleeve 27 and has a sealing fit inside the sleeve 27. Valve member 30 has suitably-located cut-away portions to enable it to perform the necessary valve action. Cut-away portions 32 and 33 are located opposite passages 25 and 26 respectively. If necessary the peg 28 may project into a slot 34 in valve sleeve 30 to prevent rotation of that sleeve.

Figure 3:
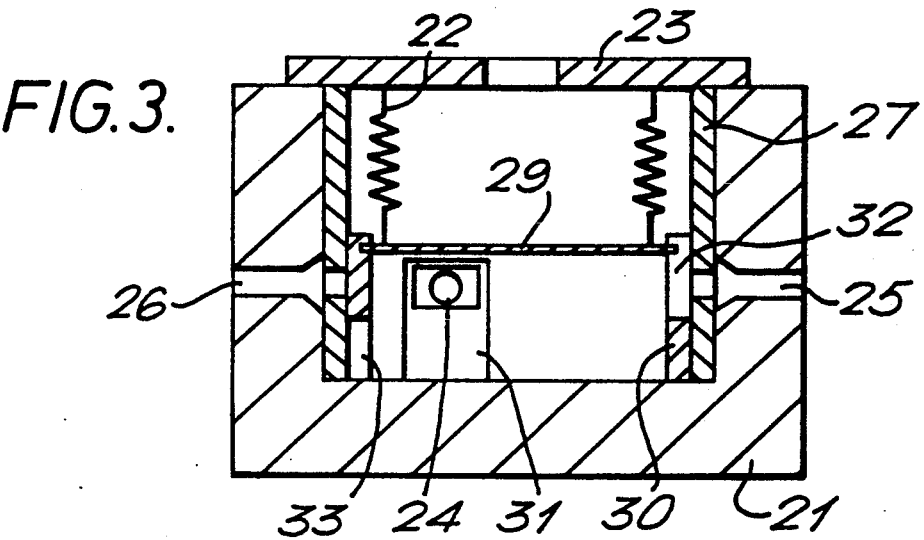
FIG. 3 is a sectional view of the valve of FIG. 2.

FIG. 3 shows the valve in one operating position, with the bellows 22 expanded to its maximum extent. The cooling liquid is at a low temperature in this situation. Liquid flows through the passage 24 in the body 21 and through cut-away 31 in member 30 into the cavity 20. Valve member 30 is in a position in which passage 26 is closed-off and passage 25 is open, thus allowing the cooling liquid to bypass the heat exchanger 12 and return directly to the heat source 10. As the temperature of the liquid rises due to the absorption of heat from the body 10, the liquid expands. The resultant increase in volume causes the bellows 22 to become compressed, thus raising the valve member 30 from its original position. The cut-away portions 32 and 33 are shaped and located so that passage 26 opens before passage 25 closes, thus allowing continuous circulation of the cooling liquid. Expansion of the liquid beyond the level required to effect the necessary movement of the valve member 30 has no further effect on the configuration of the liquid cooling circuit.

Figure 4:
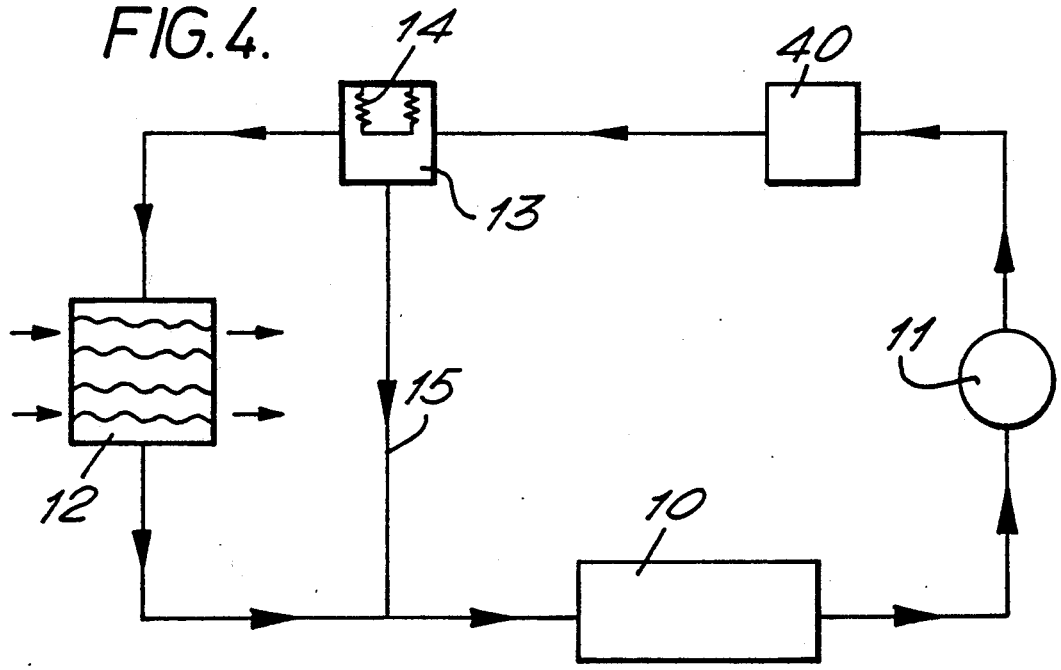
FIG. 4 is a schematic diagram of a second embodiment of the invention.

The heat-producing body 10 may take any of a number of forms. It may be an internal-combustion engine, for example or a piece of electrical or electronic equipment. In some circumstances the body 10 may initially require heating, for example if it is used in a very low temperature environment. Only when the body generates sufficient heat need the cooling system function as described above. In such a case the liquid circuit may include a heating device and controlling thermostat as shown schematically in FIG. 4 at 40. Any suitable form of heat source 40 may be used which can be controlled by a thermostat.

In the embodiments described above the cooling fluid has been a liquid. The cooling system may use a gaseous fluid in a similar way, through the coefficient of expansion and hence the volume change with temperature will be much greater.

In certain circumstances it may not be necessary to use a pump to circulate the cooling fluid and circulation may be achieved by convection alone.

The form of valve described above is perhaps the simplest mechanical arrangement which can be operated by the expansion of the cooling fluid. Other forms of valve may be provided operated by a bellow-type expansion chamber. Alternatively, other types of expansion-compensating device such as sliding piston, flexible diaphragm or the like may be used to operate a suitable form of valve.

I claim:

1. A closed circuit cooling system comprising:
a heated body;
a heat exchanger;
a cooling circuit connecting said heating body to said heat exchanger;
means for circulating a cooling fluid between said heated body and said heat exchanger via said cooling circuit; and
a valve including a variable volume actuator in said circuit for bypassing the heat exchanger, said variable volume actuator comprising an expansion chamber including a flexible bellows portion, the interior of said bellows portion being open to atmospheric pressure; wherein a change in volume of said cooling fluid causes a change in volume of said actuator so as to actuate said valve and accommodate any changes in fluid volume due to temperature changes, said heat exchanger being bypasses when said fluid has a temperature below a predetermined value.

2. A system as claimed in claim 1 wherein includes a pump for circulating said cooling fluid around said circuit.

3. A system as claimed in claim 1, wherein said valve comprises a sleeve valve arrangement.

4. A system as claimed in claim 3, wherein said sleeve valve comprises a fixed outer valve body having ports defined therein, a sliding valve member being located within said body and movable therein between positions in which at least one of said ports is open or closed respectively.

5. A system as claimed in claim 1, wherein a sleeve valve member is directly connected to said flexible bellows portion.

6. A system as claimed in claim 1, wherein heater means are provided to raise the temperature of said cooling fluid to a value close to said predetermined value.

7. A system as claimed in claim 1, wherein said cooling fluid is a liquid at said predetermined temperature.

8. A system as claimed in claim 1, wherein said heated body is a laser.

9. A closed circuit cooling system comprising:
a heated body;
a heat exchanger;
a cooling circuit connecting said heated body to said heat exchanger;
means for circulating a cooling fluid between said heated body and said heat exchanger via said cooling circuit; and
a sleeve valve arrangement comprising
a cavity having an inlet port and two outlet ports offset from one another, one of said outlet ports being connected to said heat exchanger and the other of said ports being connected back to said heated body bypassing said heat exchanger;
a sleeve valve member slidably received within said cavity; and
a flexible bellows connected to said sleeve valve member, the interior of said bellows being open to atmospheric pressure, whereby a change in volume of said cooling fluid causes said sleeve valve member to move between two conditions and allow coolant fluid to flow between the inlet port and one or the other of the outlet ports, said change in volume causing said bellows to expand or contract against said atmospheric pressure thereby accommodating any changes in fluid volume due to temperature changes, said system being operative to direct coolant fluid between said inlet port and said outlet port bypassing said heat exchanger when said fluid has a temperature below a predetermined value.

* * * * *